United States Patent Office 2,727,079
Patented Dec. 13, 1955

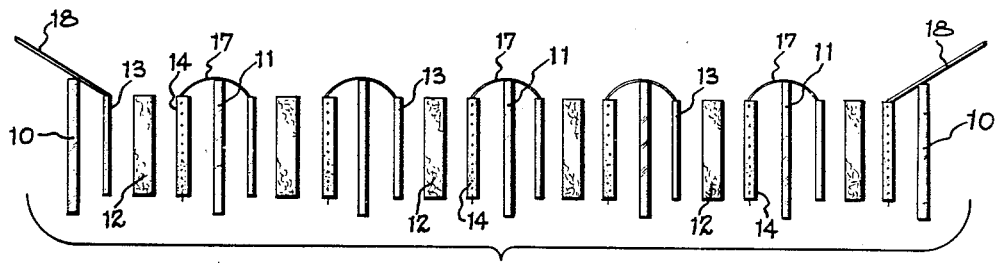
Fig. 1
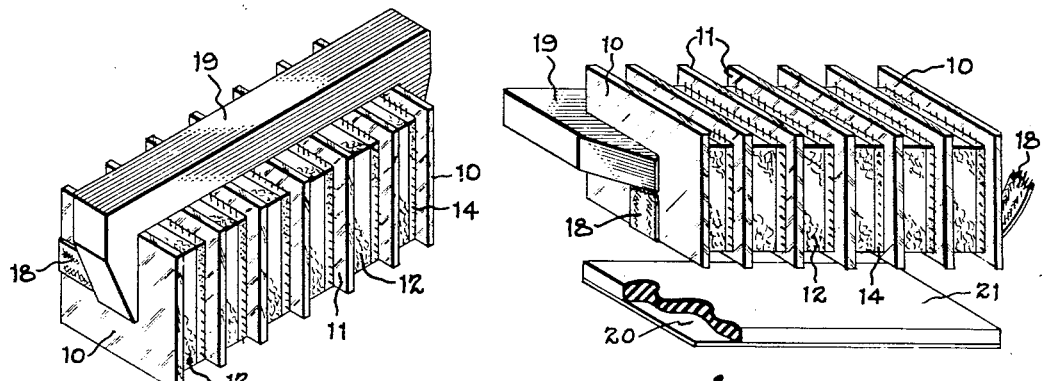
Fig. 2
Fig. 3
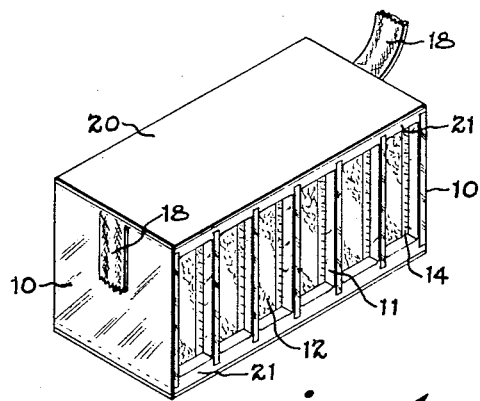
Fig. 4
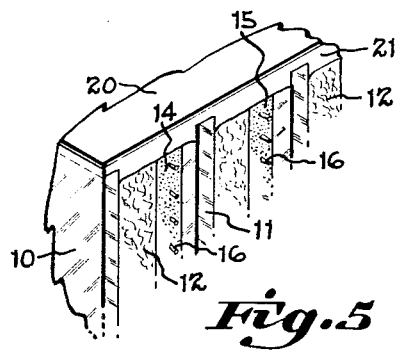
Fig. 5

2,727,079

BATTERY CONSTRUCTION

Melvin F. Chubb and James M. Dines, Joplin, Mo., assignors to The Eagle-Picher Company, Cincinnati, Ohio, a corporation of Ohio Application September 26, 1952, Serial No. 311,687

3 Claims. (Cl. 136—17)

This invention relates to a method of constructing electrolytic batteries which may be used either as primary batteries or as storage batteries. The theory of the present invention is independent of the chemical nature of the electrodes, the electrolyte, and the nature of the ionic or electrolytic action, and relates entirely to battery structure; that is, the construction and assembly of the means which are necessary for holding the electrolytically active elements in the required relationship to one another.

Conventionally, a battery consists of a container or case and electrolytically active elements which are housed in the container or case. In some instances, a single element may be used both as the battery case or container and as one of the electrodes. The ordinary dry cell is an example of this. In the manufacture of the common lead acid storage batteries, as well as batteries of other types, special molded battery cases are used as containers for the electrodes and the electrolyte. In the manufacture of such batteries, the electrodes and the battery cases are fabricated separately, then assembled merely by mounting the electrodes in the battery case. This conventional procedure has two disadvantages; (1) a separate mold must be used for each size battery which is expensive, unless the quantity production of the particular size is high, and (2) the molded battery case is apt to be fragile and brittle or, alternatively, to be very heavy, thereby increasing the weight and bulk of the battery.

The present invention involves the elimination of the molded battery case and facilitates construction of batteries immediately about the electrodes of any desired size and shape so that the electrodes and their structural housing constitute an integral structure. Thus, batteries of any desired size, shape and electrical characteristics may be readily fabricated by this method. Further, this method of housing a battery may be employed in relation to electrodes of any desired chemical composition.

The batteries of this invention are very light and strong in comparison with batteries which have been housed in usual or ordinary battery cases. For instance, the batteries of this invention may be dropped on concrete from a height of three or four feet without fracturing the housing or case in spite of the fact that the electrode housing means is very light in comparison with the weight of the battery electrodes. In fact, the batteries of this invention bounce under the conditions indicated.

It is, therefore, the objective of the inventors to provide a new method of constructing a battery and a new battery structure which is inherently adapted for use with electrodes of any desired size, number and chemical composition and which provides maximum strength and lightness for the completed battery.

Other objects and further advantages will be better understood in relation to the accompanying drawings in which:

Figure 1 is a diagrammatic, exploded, side elevational view of an assembly of battery elements comprising end closures, electrodes, cell partitions and electrode separators.

Figure 2 is a perspective view showing the elements of Figure 1 clamped together in stacked relationship.

Figure 3 is a perspective view of the clamped stack ready to receive the plastic cement side wall shown in the lower portion of the view.

Figure 4 is a perspective view of a finished battery in which the plastic cement constituting the side walls has been thermally set.

Figure 5 is a fragmentary perspective view of the front corner of the battery shown in Figure 4.

From the point of view of method, this invention involves the step of assembling a series of elements in a stack, these elements consisting of end closures, electrodes, cell partitions and electrode separators. All of these elements are relatively flat, thin, platelike or sheetlike elements, although sheet electrodes, if desired, may be fan folded together with separator material in between. In any event, the electrodes are all substantially the same size and shape; the electrode separators are dimensioned appropriately to preclude short circuiting within any given cell, and the cell partitions are characterized by over-all dimensions at least equal and preferably slightly greater than the dimensions of the electrodes. In addition to the cell partitions, end closures are employed which are the same size as the cell partitions or, if desired, may be slightly larger. The point is that the elements specified are assembled in alignment with one another in a stack which may be constituted a finished battery by the addition of side walls which bind the elements together lengthwise.

For many batteries, it is further desirable in this type of construction to employ electrode separators which are at least to some degree compressible, such as the bibulous, cellulosic pads which are now used in the non-spill types of batteries. The use of the compressible pads permits the stack of elements to be clamped with the elements in alignment and the stack as a whole under slight but tangible longitudinal pressure. If the electrodes are such that an air gap accomplishes the desired separation of the electrodes of a given cell, then dummy separators may be employed in the stack assembly and afterward removed.

After assembling the battery constituting elements as described, the elements are bound together longitudinally by application to the stack of at least two opposite side walls. These side walls are constituted by plastic sheet material and plastic cement. The cell partitions and end closures are of a plastic composition which is chosen in relation to the composition of the plastic cement so that the plastic cement bonds to the cell partitions and end closures or plates with sufficient tenacity to hold the stack of elements together lengthwise after the plastic cement is thermally set. The plastic cement is applied to at least two opposite sides of the stack by being coated on a relatively thin film of sheet material then applied to the sides of the stack. Preferably, the plastic cement also bonds to the sheet material after being thermally set, although this is not absolutely necessary. The sheet material may be a cellulosic film of the type of cellophane, or, a thicker but still flexible plastic sheeting, or a plastic plate, which is preferably resilient.

The strength of the battery structure as a whole is determined in part by the strength of the cell partitions and these may be fabricated from thin, resilient fabric sheeting or thicker sheeting of more platelike nature. The same is true for the end closures. The point, however, is that the thermally set plastic cement bonds to the transverse cell partitions and end closures, thereby holding them together in assembly. If desired, the film by which the cement was applied may be peeled off after the cement has been thermally set or it may be left on to provide a smooth, clean, exterior finish for the battery. As indicated, thicker film or sheeting or plating may be used for applying the cement instead of the thin cellophane-like film, thereby adding to the rigidity of the battery as a whole. Preferably, the thickness of all of the sheet plastic material is kept down to the minimum required for the size and the weight of the electrodes, whereby the finished battery is resilient or flexible and yields resiliently to the impact of a blow, as exemplified by bouncing when dropped on concrete.

By this method two, three or four sides may be applied to the stack of elements to bind them together longitudinally and thus complete the battery. If compressible, bibulous pads are used as electrode separators, and if flexible cell partitions slightly larger than the electrodes are employed, each cell partition is reinforced by the electrode which presses against it on its opposite side and the electrodes, in turn, are protected from shock and vibration by virtue of the flexibility of the cell partitions against which they press. Thus, the battery structure tends to absorb shock and vibration and houses the electrodes with minimum added weight and minimum added consumption of space. Such batteries are particularly suitable for use on airborne equipment.

Referring now to the drawings, a stack of sheetlike or platelike battery constituting elements is assembled as disclosed in Figure 1. These elements comprise sheetlike or platelike plastic end closures 10, sheetlike or platelike plastic cell partitions 11, electrode separators 12, which may be bibulous cellulosic pads, negative electrodes 13, and positive electrodes 14. Electrodes of any desired chemical composition may be used in the practice of this invention, but for purposes of illustration only, we have disclosed sheet magnesium negative electrodes and pasted cuprous chloride positive electrodes— the latter constituted by a mass of cuprous chloride paste 15 which is affixed to a metallic sheet or grid 16. As disclosed, the positive electrodes 14 and negative electrodes 13 of the stack alternate, with an electrode separator 12 disposed between the electrode at one end of the stack and the adjacent electrode of opposite polarity, then a cell partition 11 between the latter electrode and the next electrode which is of the same polarity as the end electrode of the stack, and so on. If the cells are to be connected in series as disclosed, then the two electrodes on opposite sides of any given cell partition are connected electrically by a connector 17 which passes over the top of the cell partition, and the terminal electrodes of the stack are provided with electrically conductive leads 18 which serve as battery terminals. If desired, the polarity of the respective leads may be indicated by making the two end closures of different colored plastic material, such as red and green or other contrasting colors.

The electrodes themselves need not necessarily be platelike but may if desired be fan folded together with separator material in between, as disclosed in co-pending application, Serial No. 311,752, filed September 26, 1952, entitled "Silver Peroxide Battery and Method of Making," or as disclosed in application Serial No. 283,938, filed April 23, 1952, entitled "Cuprous Chloride Magnesium Cell With Cellophane Membrane." In other words, neither the chemical composition of the electrodes, nor the shape of the electrodes is of the essence of the present invention, nor is the specific nature of the electrode separators. The method of constructing the battery and the resulting structure are susceptible to employment with any desired electrolytic elements but, nevertheless, the method and structure particularly lend themselves to utilization in the manufacture of batteries which are constituted by individual wafer-like cells of the non-spill type, which are connected in series.

After the stack of battery constituting elements is arranged as disclosed in Figure 1, it is pressed together by a clamp 19 as disclosed in Figure 2. The non-spill or bibulous pads 12 are slightly compressible and when compressed tend to expand slightly so that the elements of the stack are held together under light but tangible pressure. This arrangement also secures the bibulous pads within the battery by friction and insures intimate engagement of each face of the pad with the adjoining electrode.

Next, as disclosed in Figure 3, a sheet of plastic material 20 is coated with a layer of thermally settable plastic cement 21 and pressed against one side of the battery. Preferably the layer of cement is sufficiently thick to permit the edges of the cell partitions 11 and end closures 10 to be embedded in cement as shown in Figure 5. As indicated in Figure 4, the opposite side of the battery is cemented in the same manner, after which the plastic cement is thermally set. If desired, the same treatment may be given to one or both of the two remaining sides of the battery stack. The purpose of this treatment is to bind the elements of the stack together longitudinally to constitute an integral structure and, after the thermal setting of the cement, the clamp 19 may be removed. Thus, a battery and a battery case are constituted by a single operation.

Preferably, although not necessarily, the connectors 17, which join adjacent positive and negative electrodes over the edge of the intermediate cell partition 11 are disposed at an enclosed side of the battery. Thus, each connector is partially embedded in the plastic cement. This expedient locks the connector to the edge of the cell partition, and since the connector is affixed to its respective electrodes, thereby indirectly anchors the electrodes to the cell partition. The bibulous electrode separators 12 also may be anchored in a like manner. Where these pads are made of fibrous cellulosic materials, such as cotton, it is found that the fibers become embedded in the plastic cement forming a secure bond between pad and wall.

The strength of the battery so constituted depends upon the nature, strength and weight of the plastic materials which enter into the fabrication, and the requirement for strength, in turn, depends upon the nature of the environment in which the battery is to be used. By using brittle, platelike plastics, a very rigid structure may be obtained, but on the other hand, the use of flexible plastics may result in a structure which may be subjected to shock without injury. Since the heavy, brittle type of battery casings may be conveniently fabricated by conventional molding operations, it is believed that the present invention is most suitable for building light, resilient batteries which are not adversely affected by physical concussion or by continuing vibration.

In either case, it is requisite that the plastic materials, particularly the end closures and cell partitions, be compatible with the plastic cement so that the latter bonds to them when it is thermally set. As to the sheet material by which the plastic cement is applied to the sides of the stack, considerable latitude is possible as to bonding characteristics. If desired, a sheet material may be used which is not compatible with the plastic cement and which may be removed easily after the thermal setting. This practice, however, is not recommended; on the contrary, it is recommended that this sheet material be chosen in relation to the plastic cement to bond securely and that the thickness of the sheet material be related to the rigidity requirement of the battery. The sheet materials, therefore, may vary in strength from a very thin pliable film, such as regenerated cellulose or vinyl plastic film, to heavy plastic plate. If desired, the bottom of the battery may be constituted by platelike sheet plastic, and the top and sides by lighter sheet plastic elements. Thus, the method of this invention is particularly suitable for constructing specific batteries which are particularly designed for special conditions of usage.

One system of compatible plastics is exemplified by the use of vinyl plastisol as the thermally setting cement. This product comprises the copolymer of vinyl chloride and vinyl acetate plasticized with a solvent plasticizer such as dioctyl phthalate combined with an ester of ricinoleic acid. Such a plastic has a setting temperature in the neighborhood of 350° F. After being thermally set, this product becomes a tough, hornlike, resilient mass which is slightly flexible but tends to retain shape and which withstands shock without cracking. The finished product is not readily stretchable and has substantial rigidity, yet it is distinctly different physically from the ordinary brittle plastic of the Bakelite or polystyrene type.

With such a plastic cement, the sheet materials employed, that is, the end closures, the cell partitions and the sheeting by which the plastic is applied, may be made up of vinyl plastic, chlorinated rubber or methyl methacrylate. As indicated, the weight and flexibility of these elements, individually and collectively may be chosen to provide a finished battery of any desired characteristics to suit it for use in any specific environment.

If desired, this battery structure may be fabricated about dummy electrodes which are removed after the thermal setting and the service electrodes may be insetted later as a separate operation. Such practice, however, does not take full advantage of the values of the invention—one of the primary of which is to build a battery in a single operation as distinguished from fabricating the electrode assemblies and the battery cases as two separate operations, then assembling them as a third operation.

Having described our invention, we claim:

1. A battery comprising a plurality of electrodes, electrode connectors, electrode separators, end closure plates and at least two side walls, said end closure plates and electrode separators formed solely of platelike sheets of plastic material, said side walls formed of thermally set plastic material, said end closure plates and electrode separators being of substantially identical shape and disposed in spaced aligned parallelism, an electrode disposed at each of the opposite faces of each cell separator with the electrode connector for these electrodes extending around an edge of said electrode separator, and opposite edges of each of the electrode separators and end closure plates embedded in the thermally set plastic material constituting said side walls.

2. A structurally integral electrolytic battery having a plurality of series connected cells, said battery consisting of two end plates and one or more cell partitions, each end plate and partition consisting of a plastic sheet having a facial area congruous with that of each other sheet, means for holding the respective edges of said plastic sheets together in alignment with one another, said means comprising a layer of plastic affixed to the edges of said plastic sheets on at least two opposite sides thereof to constitute side walls of the battery and a plurality of included cell compartments, a composite electrode structure connected to each cell partition and supported thereby, said structure comprising a metal strip cemented over the edge of a cell partition, an electrode contacting the metal strip on each side of the partition, and bibulous electrode spacing means disposed in each cell to separate the positive and negative electrodes thereof, the over-all spacing of the end plates being related to the combined thickness of the electrodes, partitions and separators so that the end plates hold them together in assembly under slight positive pressure.

3. A structurally integral electrolytic battery having a plurality of series connected cells, said battery consisting of two end plates and one or more cell partitions, each end plate and partition consisting of a plastic sheet having a facial area congruous with that of each other sheet, means for holding the respective edges of said plastic sheets together in alignment with one another, said means comprising a layer of plastic adhesively affixed to the edgewise portions of said plastic sheets in liquid-tight relation thereto on at least two opposite sides thereof to constitute side walls of the battery and a plurality of included cell compartments, a composite electrode structure connected to each cell partition and supported thereby, said structure comprising a metal strip cemented over an edge of each cell partition, an electrode engaging the metal strip on each side of the partition, a terminal strip disposed on the inside of each end plate with an electrode connected therewith, and bibulous electrode spacing means disposed in each cell to separate the positive and negative electrodes thereof, the over-all spacing of the end plates being related to the combined thickness of the electrodes, partitions and separators so that the end plates hold the elements together in assembly under slight, but tangible, pressure.

References Cited in the file of this patent

UNITED STATES PATENTS

| | | |
|---|---|---|
| 664,198 | Wetherill | Dec. 18, 1900 |
| 1,631,568 | Yngve | June 7, 1927 |
| 2,025,631 | Adamski | Dec. 24, 1935 |
| 2,272,969 | French | Feb. 10, 1942 |
| 2,564,495 | Mullen | Aug. 14, 1951 |
| 2,639,306 | Fischbach | May 19, 1953 |
| 2,684,395 | Chubb | July 20, 1954 |